Nov. 28, 1944.  L. R. EVANS  2,363,721
COLLET ACTUATING DEVICE FOR MACHINE TOOLS
Filed Feb. 1, 1944  2 Sheets-Sheet 1
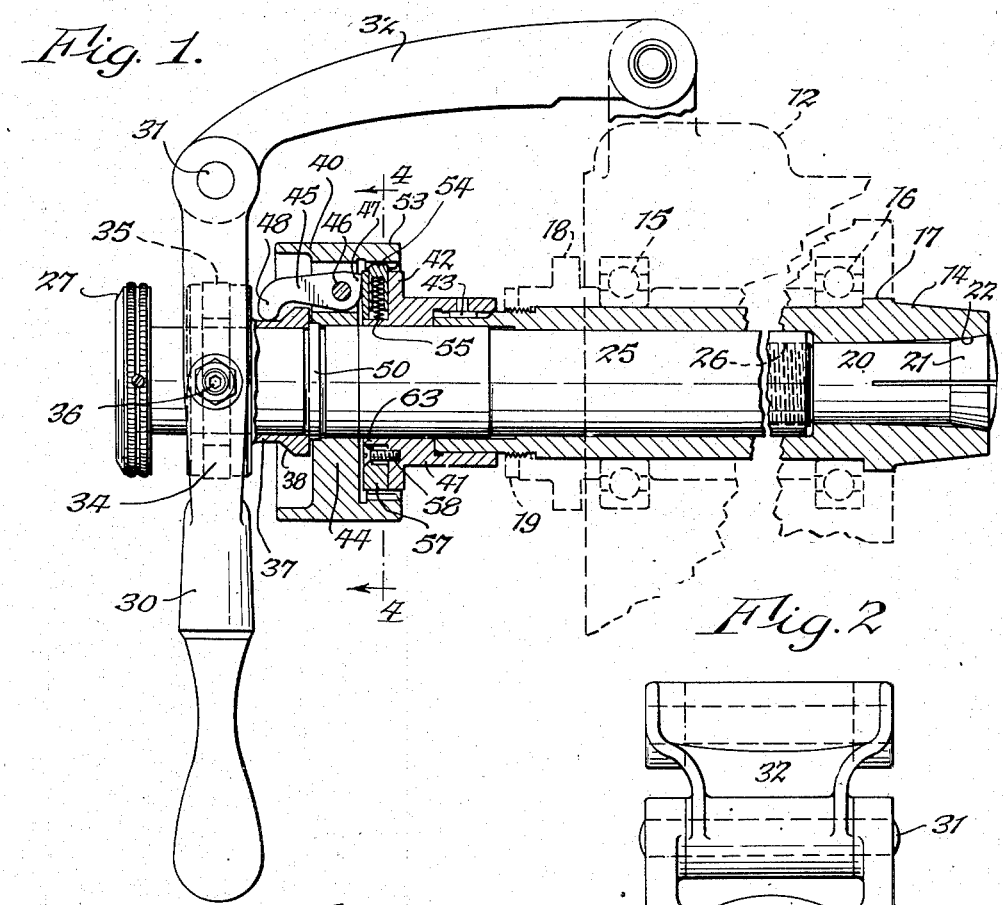
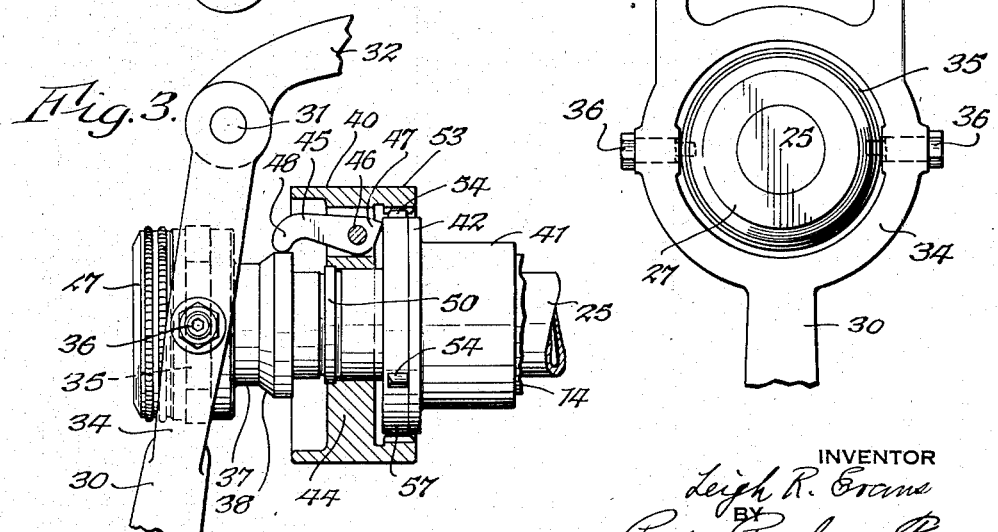

Nov. 28, 1944.    L. R. EVANS    2,363,721
COLLET ACTUATING DEVICE FOR MACHINE TOOLS
Filed Feb. 1, 1944    2 Sheets-Sheet 2

INVENTOR
Leigh R. Evans
BY Parker, Crochron & Farmer,
ATTORNEYS

Patented Nov. 28, 1944

2,363,721

UNITED STATES PATENT OFFICE 2,363,721

COLLET ACTUATING DEVICE FOR MACHINE TOOLS

Leigh R. Evans, Elmira, N. Y., assignor to Hardinge Brothers, Inc., Elmira, N. Y.

Application February 1, 1944, Serial No. 520,612

9 Claims. (Cl. 279—51)

This invention relates to mechanism for operating collets on lathes and similar machines to open and close the jaws thereof while the machine is running.

One of the objects of this invention is to provide a positive and reliable quick acting and quickly adjustable mechanism for collets of lathes and similar machines. Another object is to provide a mechanism of this type in which centrifugal force tends to hold the parts more securely in locked position to prevent opening of the collet when the machine is in operation. It is also an object of this invention to provide mechanism of this type having an improved and stronger ratchet mechanism for yieldingly holding the collet draw tube in adjusted relation to the spindle of the machine.

Other objects and advantages of this invention will appear from the following description and claims.

In the accompanying drawings:

Fig. 1 is a fragmentary sectional elevation of a collet actuating device embodying this invention.

Fig. 2 is a fragmentary end elevation thereof.

Fig. 3 is a fragmentary elevation thereof, similar to Fig. 1, but showing the parts of the mechanism in different positions.

Figure 4:
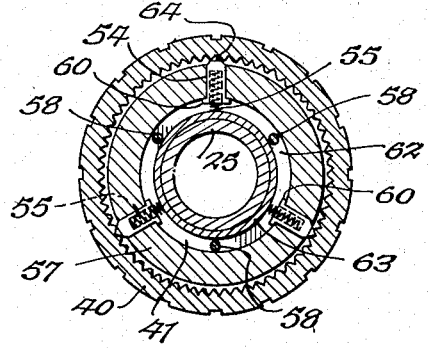
Fig. 4 is a sectional elevation thereof, on line 4—4, Fig. 1.

In Fig. 1, I have shown one embodiment of my improved mechanism as applied to the headstock 12 of a lathe, but it will be understood that this invention may be applied to any machine tool in which collets may be used. 14 represents the spindle of the lathe which is suitably journalled in the headstock, for example, by means of ball bearings 15 and 16, which rotatably support the spindle and which also hold the spindle against endwise movement relatively to the headstock by any suitable means, such for example as an annular shoulder 17 formed on the spindle itself which engages with the inner race on the ball bearing 16, and a nut 18, a portion of which has a threaded engagement with a part of the spindle and which engages the inner race of the ball bearing 15. 19 represents a lock nut which may be employed for holding the nut 18 against turning on the spindle. The spindle may be rotated by any suitable or desired means, not shown in the accompanying drawings. Any other suitable means for rotatably mounting the spindle in a machine tool and for holding the spindle against endwise movement may be employed in place of those shown.

20 represents the collet which may be of any usual or suitable construction, and which is provided with a beveled or inclined annular face 21 formed to engage with a correspondingly beveled inner surface 22 of the spindle 14. The jaws of the collet are normally held in their open position by their own resiliency and may be moved toward each other into position to grip the work or a tool by drawing the collet to the left in Fig. 1.

The opening and closing of the jaws of the collet is usually accomplished by means of a draw tube 25 which has an internally threaded portion 26 engaging with a corresponding externally threaded end portion of the collet 20. The draw tube 25 has a sliding fit in the spindle and extends beyond the left end of the spindle in Figs. 1 and 3, and the collet draw tube may be provided at this end thereof with a knurled knob or hand wheel 27 by means of which the draw tube can be turned relatively to the lathe spindle 14.

The opening and closing of the collet is effected by movement of the draw tube lengthwise of the spindle, and in order to provide for a quick opening and closing of the collet, a hand lever 30 is provided, that shown being pivoted at 31 on one end of a link 32, the other end of which is pivoted on the headstock 12 in the construction shown. This hand lever 30 is provided with an enlarged circular portion 34 through which the collet draw tube extends and which is connected with the draw tube so as to move the same in the direction of its length while this tube is rotating. Any suitable connection may be employed between the lever and the draw tube. For example, in the construction shown, the lever may be connected to a ring 35 by means of trunnions or screws 36 and this ring, which may be formed in two halves suitably secured together, may be arranged within an annular groove or recess formed in a sleeve 37 which is rotatably and slidably mounted on the draw tube. This sleeve has an annular inclined or beveled portion 38.

The collet draw tube also has rigidly mounted thereon adjacent to the sleeve 37 a ratchet shell 40 having internal ratchet teeth, and the spindle 14 has secured thereto an extension 41 provided with an outwardly extending flange 42 which has one or more dogs or latches which cooperate with the ratchet teeth of the shell to releasably hold the spindle and tube in the desired relation to each other. The sleeve 41 is held against turning relatively to the spindle by any suitable means, such as a key 43 engaging in a keyway in a spindle and the sleeve preferably has an internal shoulder which abuts against the end of the spindle so that thrusts against the sleeve will be transmitted to the spindle.

Suitable means are provided on the ratchet shell to exert a thrust against the flange 42 of the sleeve or extension 41 of the spindle to pull the collet draw tube to the left from the position shown in Fig. 1, to draw the jaws of the collet toward each other. For this purpose, the radial portion 44 of the ratchet shell has a plurality of levers 45 pivoted thereon at 46. One end of each lever has a cam or eccentric portion 47 thereon which may react against the flange 42 of the spindle extension 41, and the other end of each lever 45 is provided with a radially inwardly extending arm 48 which may engage the beveled portion 38 of the slidable sleeve 37. Consequently, when the hand lever 30 is swung to the left from the position shown in Fig. 1 into the position shown in Fig. 3, the ends 48 of the small levers 45 will be forced to move radially outwardly from the axis of the collet draw tube, thus forcing the cam portions 47 of these levers to react against the flange 42, thus causing the ratchet shell 40 to be moved to the left and drawing the collet 21 into the flaring end 22 of the lathe spindle into a closed or gripping position. The ratchet shell may be held against endwise movement relatively to the collet tube by any suitable means, such for example as a shouldered portion 50 on this tube.

Since the movement produced by means of the hand lever 30 and the small levers 45 is necessarily small and merely serves to cause the collet to grip the work or tool, it is important that the collet draw tube and the collet be in such adjusted relation to the spindle 14 that this limited movement by means of the hand lever will be sufficient to cause the collet to grip the work or tool with the desired force. For this reason, accurate adjustment of the collet lengthwise of the draw tube by means of the cooperating threaded portions 26 is necessary. This adjustment of the collet and its draw tube relatively to the lathe spindle can be effected by means of the correct positioning of the ratchet sleeve 40 with reference to the flange or disk 42 of the spindle, and this adjustment may be effected by turning the ratchet shell 40 relatively to the disk 42. When these two parts are adjusted into the desired position, they are releasably held in such position by suitable ratchet means.

Figure 5:
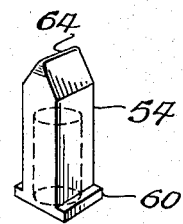
Fig. 5 is a perspective view, on an enlarged scale, of one of the dogs or latches employed in the mechanism.

In the particular construction illustrated for this purpose, the ratchet shell 40 is provided with a laterally extending annular flange 53 having ratchet teeth on the inner face thereof, and the disk 42 is provided with a plurality of dogs or latch members 54, the outer ends of which are suitably shaped to cooperate with the ratchet teeth on the shell 40. These dogs or latches are urged outwardly by means of springs 55, and in the construction shown in Figs. 1 to 5, these dogs or latches are substantially square or rectangular in cross section and are seated in grooves of similar shape formed in a ring 57 which may be suitably secured to the flange or disk 42 in any suitable manner, for example, by means of screws 58 shown in Fig. 1. The dogs 54 are provided at their inner ends with outwardly extending flanges 60, see Figs. 4 and 5. A portion of the inner face of the ring 57 is cut out to form a space 62 with a tubular extension 63 of the flange 42, as clearly shown in Fig. 4, so that this space provides room for the dogs or latches 54 to move relatively to the ring 57. Since these dogs or latches are of rectangular cross section and operate in similar radial grooves in the ring 57, it is obvious that they will be held from turning in the ring so that the outer edges or teeth 64 of the latches will at all times remain parallel to the ratchet teeth on the inner face of the ratchet shell 40. Any other suitable or desired means may be provided for mounting the dogs or latches on the flange or disk 42.

Figure 6:
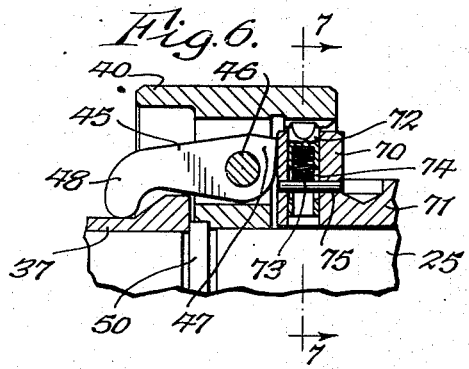
Fig. 6 is a fragmentary sectional elevation of a collet actuating device of modified construction, on an enlarged scale.
Figure 7:
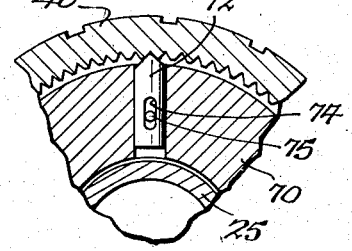
Fig. 7 is a section thereof, on line 7—7, Fig. 6.

In the modified construction shown in Figs. 6 and 7, the ratchet shell 40 cooperates with dogs of modified construction. In these figures, the body portions of the dogs are of cylindrical shape and fit into round holes formed in an outwardly extending flange 70 formed on a sleeve or tubular extension 71 which is secured to the spindle. The dogs or latches 72 are bored out from their inner ends to receive the springs 73, and each dog is also provided at opposite sides thereof with elongated slots 74 which are so arranged that a pin 75 may extend through the slots 74 and into holes in the flange 70 in such a manner that these pins will hold the dogs with their teeth parallel to the internal teeth of the ratchet shell 40. The spring 73 of each dog or ratchet bears against the pin 75 and against the closed upper end of the dog or ratchet in such a manner as to urge the dogs or ratchets outwardly.

Figure 8:
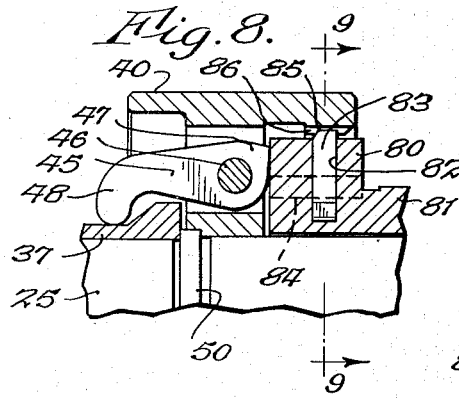
Fig. 8 is a fragmentary sectional elevation of a collet actuating mechanism of still another modified construction.
Figure 9:
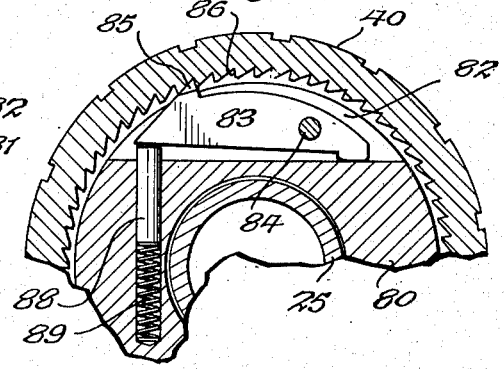
Fig. 9 is a section thereof, on line 9—9, Fig. 8.

Another modified form of dog or latch is shown in Figs. 8 and 9, in which a flange or disk 80 is formed on a sleeve 81 secured to the spindle, and in which the flange is provided with one or more grooves or slots 82 in each of which a dog or latch 83 is arranged to swing about a pivot 84, only one dog or latch being shown in Figs. 8 and 9. Each dog has a tooth 85 shaped to engage with ratchet teeth 86 of the ratchet shell 40 in such manner that the ratchet shell may turn in either direction relatively to the dog. Adjacent to the outer end of the dog 83, a plunger 88 is provided which is slidable in a hole formed in the flange or disk 80, a coil spring 89 being provided in the hole to urge the plunger 88 outwardly against the end of the dog 83 to swing the same in a direction in which the tooth 85 will engage with the ratchet teeth of the shell 40.

In the use of the apparatus described, if a collet is desired to grip a certain type of workpiece, it is first necessary to seat the collet so that the jaws will grip the workpiece securely when the hand lever 30 is in the position shown in Fig. 3, and to release the workpiece when the hand lever is in the position shown in Fig. 1. In order to accomplish this, the collet and spindle may be held against rotation while the ratchet shell 40 is turned. This will result in a turning of the threaded part 26 of the collet draw tube relatively to the thread on the collet, so that the collet may be moved in or out relatively to the tapering portion 22 of the spindle. When the desired position of the collet relatively to the draw tube 25 is attained, it is merely necessary to release the shell. The dogs or latches of the flange of the sleeve secured to the spindle will then engage with the teeth of the ratchet shell so as to hold the draw tube and spindle in desired relation to each other. The workpieces may then be gripped one at a time by the collet by first placing them into the open jaws of the collet and then pushing the hand lever 30 to the left. The hand wheel or knob 27 may serve as a stop to limit the extent to which the lever may be moved to the left or collet closing position. During this movement of the ratchet shell relatively to the spindle, the teeth of the dogs will slide lengthwise along the teeth of the ratchet disk. After the required work has been done, the workpieces are released by again pushing the hand lever to the right.

The construction described has the advantage that the work can be very quickly gripped by the collet and released therefrom by merely actuating the hand lever, and the collet can be quickly adjusted relatively to the draw tube by merely turning the ratchet shell relatively to the spindle and the collet. The dogs or latches which cooperate with the ratchet teeth on the shell are all so arranged that when the spindle is rotating, centrifugal force will augment the action of the springs urging the dogs outwardly, so that the higher the speed of the spindle, the more rigidly the dogs engage the teeth of the ratchet disk 40 and prevent relative rotary motion between the spindle and draw tube. By preventing the dogs or latches from turning, it will be impossible for the latch teeth to get out of parallel relation to the teeth on the ratchet shell 40 so that the tendency of the teeth to become broken or unevenly worn will be avoided.

The construction described is sufficiently sturdy so that the operator may adjust the collet by grasping the ratchet shell 40 while rotating the spindle 14 by means of the usual power drive, so that very quick adjustment is possible.

I claim as my invention:

1. In a quick acting and quickly adjustable opening and closing device for a collet of a lathe or similar machine having a hollow rotary spindle and a collet draw tube therein, that improvement which includes a ratchet shell rigidly mounted on said draw tube adjacent to an end of said spindle, and having ratchet teeth on an inner face thereof extending substantially parallel to said draw tube, an outwardly extending flange on said spindle, a dog mounted on said flange for engagement with said ratchet teeth to releasably hold said draw tube in the desired relation to said spindle, and lever actuated means for moving said collet tube lengthwise relatively to said spindle to open and close said collet.

2. In a quick acting and quickly adjustable opening and closing device for a collet of a lathe or similar machine having a hollow rotary spindle and a collet draw tube therein, that improvement which includes a ratchet shell rigidly mounted on said draw tube adjacent to an end of said spindle, and having ratchet teeth on an inner face thereof extending substantially parallel to said draw tube, an outwardly extending flange arranged within said shell and mounted on said spindle, a dog on said flange and urged outwardly into engagement with the ratchet teeth of said shell for yieldingly holding said tube and spindle against relative rotary motion, and means for imparting limited movement of said tube lengthwise of said spindle to open and close said collet.

3. In an opening and closing device for a collet of a lathe or similar machine having means for quickly moving a collet draw tube relatively to a spindle for opening and closing the collet, that improvement for adjusting the collet relatively to the spindle which comprises a ratchet shell secured on the draw tube and having internal ratchet teeth, and a dog carrying member on the lathe spindle having a toothed dog arranged thereon with its tooth movable inwardly and outwardly in a substantially radial direction to engage the ratchet teeth of said shell, to permit adjustment of said draw tube relatively to said collet and said spindle and to hold said draw tube in adjusted relation to said collet and spindle.

4. In an opening and closing device for a collet of a lathe or similar machine having means for quickly moving a collet draw tube relatively to a spindle for opening and closing the collet, that improvement for adjusting the collet relatively to the spindle which comprises a ratchet shell secured on the draw tube and having internal ratchet teeth, an outwardly extending flange on said spindle and which extends within said shell, a plurality of dogs on said flange having toothed portions formed for engagement with the teeth of said shell and arranged to be urged outwardly by centrifugal force when said spindle is rotating, and means for yieldingly urging said toothed portions outwardly into engagement with said shell, said dogs permitting rotation of said shell relatively to said flange for adjusting said collet relatively to said spindle and yieldingly holding said shell in adjusted relation to said collet and spindle.

5. In an opening and closing device for a collet of a lathe or similar machine having means for quickly moving a collet draw tube relatively to a spindle for opening and closing the collet, that improvement for adjusting the collet relatively to the spindle which comprises a ratchet shell secured on the draw tube and having internal ratchet teeth, an outwardly extending flange on said spindle and which extends within said shell, a plurality of dogs on said flange having toothed portions formed for engagement with the teeth of said shell and arranged to be urged outwardly by centrifugal force when said spindle is rotating, a ring on said flange and having substantially radial recesses formed therein and in which said dogs are slidable, and means for yieldingly urging said dogs outwardly into engagement with said teeth of said ratchet shell.

6. A mechanism according to claim 5 in which said dogs are of rectangular cross section and said radial recesses are of similar cross sectional form to hold said dogs against turning in said recesses.

7. In an opening and closing device for a collet of a lathe or similar machine having means for quickly moving a collet draw tube relatively to a spindle for opening and closing the collet, that improvement for adjusting the collet relatively to the spindle which comprises a ratchet shell secured on the draw tube and having internal ratchet teeth, an outwardly extending flange on said spindle and which extends within said shell, said flange having a plurality of substantially radial holes therein, dogs arranged in said holes having teeth for engaging the teeth of said shell, springs in said holes for urging said dogs outwardly into engagement with the teeth of said shell, and means for holding said dogs against turning in said holes.

8. In an opening and closing device for a collet of a lathe or similar machine having means for quickly moving a collet draw tube relatively to a spindle for opening and closing the collet, that improvement for adjusting the collet relatively to the spindle which comprises a ratchet shell secured on the draw tube and having internal ratchet teeth, an outwardly extending flange on said spindle and which extends within said shell, a dog pivoted on said flange and having a tooth movable into and out of engagement with said shell when said dog swings on its pivot, and yielding means urging said dog to swing on its pivot into engagement with the teeth of said shell.

9. In an opening and closing device for a collet of a lathe or similar machine having means for quickly moving a collet draw tube relatively to a spindle for opening and closing the collet, that improvement for adjusting the collet relatively to the spindle which comprises a ratchet shell secured on the draw tube and having internal ratchet teeth, an outwardly extending flange on said spindle and which extends within said shell, said flange having a slot extending inwardly from its periphery, a toothed dog in said slot and pivoted on said flange to swing to permit the tooth thereof to engage the teeth of said ratchet shell, and means for urging said dog to swing into engagement with the teeth of said shell.

LEIGH R. EVANS.